(12) United States Patent
Cotoros

(10) Patent No.: US 11,303,816 B2
(45) Date of Patent: Apr. 12, 2022

(54) DETACHABLE CAMERA BLOCK FOR A WEARABLE DEVICE

(71) Applicant: FACEBOOK TECHNOLOGIES, LLC, Menlo Park, CA (US)

(72) Inventor: Ingrid Anda Cotoros, Hillsborough, CA (US)

(73) Assignee: FACEBOOK TECHNOLOGIES, LLC, Menlo Park, CA (US)

( * ) Notice: Subject to any disclaimer, the term of this patent is extended or adjusted under 35 U.S.C. 154(b) by 0 days.

(21) Appl. No.: 17/035,554

(22) Filed: Sep. 28, 2020

(65) Prior Publication Data
US 2022/0014680 A1    Jan. 13, 2022

Related U.S. Application Data

(60) Provisional application No. 63/049,520, filed on Jul. 8, 2020.

(51) Int. Cl.
*H04N 5/232* (2006.01)
*G06F 3/14* (2006.01)
*H04N 5/247* (2006.01)

(52) U.S. Cl.
CPC ....... *H04N 5/23299* (2018.08); *G06F 3/1423* (2013.01); *H04N 5/247* (2013.01)

(58) Field of Classification Search
CPC ... H04N 5/23299; H04N 5/247; G06F 3/1423
USPC .......................................... 348/158
See application file for complete search history.

(56) References Cited

U.S. PATENT DOCUMENTS

| | | | | |
|---|---|---|---|---|
| 2010/0194860 A1* | 8/2010 | Mentz | ................. | H04M 1/0264 348/47 |
| 2015/0029227 A1* | 1/2015 | Park | ..................... | G06F 1/1622 345/659 |
| 2015/0296963 A1* | 10/2015 | Byun | ....................... | A45F 5/02 224/191 |

(Continued)

FOREIGN PATENT DOCUMENTS

| GB | 2565792 A | 2/2019 |
|---|---|---|
| WO | 2015102464 A1 | 7/2015 |

OTHER PUBLICATIONS

International Search report and Written Opinion for International Application No. PCT/US2021/038929, dated Sep. 29, 2021, 12 pages.

*Primary Examiner* — Michael Lee
(74) *Attorney, Agent, or Firm* — Morgan, Lewis & Bockius LLP

(57) ABSTRACT

A wearable device includes a strap, a base connected to the strap, a display detachably connected to the base, and a camera embedded within the display. The display is configured to rotate around a perimeter of the base to adjust the orientation of the camera with respect to the base. Rotating the display allows the camera to capture one or more fields-of-view at different positions with respect to the base. In some embodiments, the display includes two or more cameras having distinct lenses. In some embodiments, the lenses of the two or more cameras are macro lenses, prime telephoto lenses, optical zoom lenses, or normal lenses. In some embodiments, the wearable device includes a second alternative display having one or more embedded second cameras. The second display is configured to detachably couple to the base after detaching the first display.

19 Claims, 10 Drawing Sheets

(56) References Cited

U.S. PATENT DOCUMENTS

| | | | |
|---|---|---|---|
| 2015/0365119 A1* | 12/2015 | Shin .................... | H04M 1/0233 |
| | | | 455/575.1 |
| 2016/0124395 A1* | 5/2016 | Lee ....................... | G04G 17/00 |
| | | | 368/239 |
| 2016/0128209 A1* | 5/2016 | Yoon ..................... | G06F 1/163 |
| | | | 361/679.01 |
| 2016/0218762 A1* | 7/2016 | Tian ..................... | H04M 1/0256 |
| 2017/0003720 A1* | 1/2017 | Robinson ............. | G06F 3/0488 |
| 2017/0052561 A1* | 2/2017 | Proksch ................ | G06F 1/163 |
| 2017/0195830 A1* | 7/2017 | Ko ........................ | H04W 4/80 |
| 2017/0237459 A1* | 8/2017 | Kim ...................... | G06F 1/163 |
| | | | 455/575.6 |
| 2017/0249862 A1 | 8/2017 | Border | |
| 2017/0255019 A1 | 9/2017 | Lyons | |
| 2018/0152215 A1 | 5/2018 | Simpson, III | |
| 2018/0307333 A1* | 10/2018 | Lim ....................... | G06F 1/163 |
| 2018/0314213 A1* | 11/2018 | Park ..................... | G04G 17/045 |
| 2019/0369465 A1* | 12/2019 | Woodman ............. | H04N 5/2252 |
| 2020/0333837 A1* | 10/2020 | Weiner .................. | G06F 1/163 |

\* cited by examiner

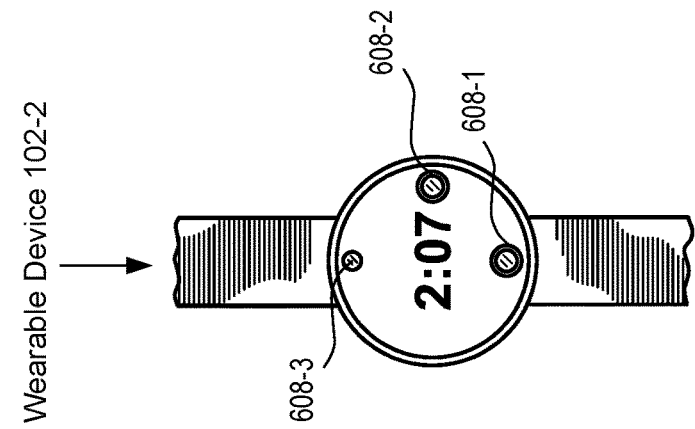
Figure 6C
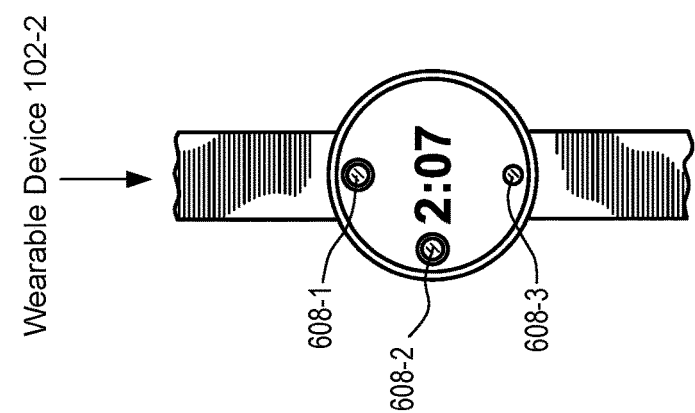
Figure 6B
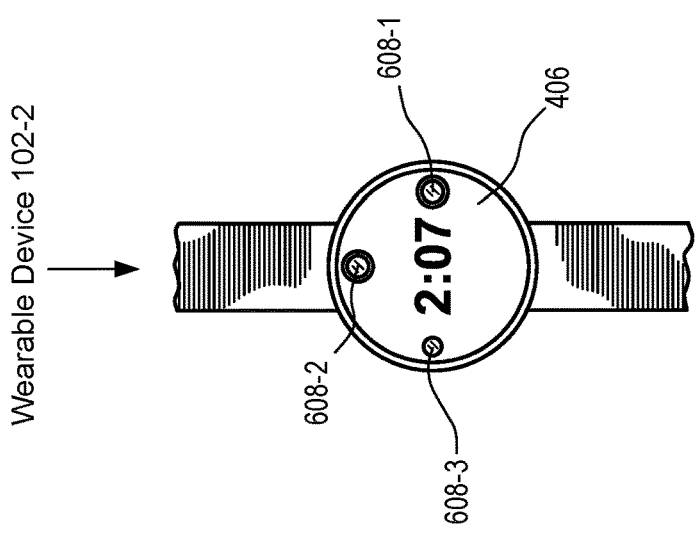
Figure 6A
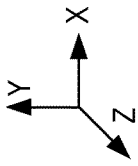

700

A wearable device has a strap, a base coupled to the strap, and a first display coupled to the base. The first display has a first camera. 702

The base includes one or more pads configured to electrically connect to one or more pads of the display. 704

The display includes one or more pads configured to electrically connect to one or more pads of the base. 706

The one or more pads of the base are further configured to magnetically adhere to one or more pads of the display based on magnetic coupling between the pads of the display and the pads of the base. 708

Detach the first display from the base. 710

Attach a second display to the base. The second display is distinct from the first display and has a second camera. 712

The second display includes two or more cameras having distinct lenses. 714

Each lens of the two or more cameras is one of: a wide angle lens, a macro lens, a telephoto lens, a zoom lens, or a fisheye lens. 716

The first and second displays are both configured to make an electrical connection between the one or more pads of the respective display with the one or more pads of the base at any of a predetermined set of rotational orientations of the display with respect to the base. 718

The one or more pads electrically and/or magnetically adhere the display to the base at 0, 45, 90, 135, and 270 degree orientations with respect to a first orientation. 720

Rotate the second display about an axis normal to the base in a first direction to capture, using the second camera, a first field-of-view. 722

Rotate the second display about the axis normal to the base in a second direction, distinct from the first direction, to capture, using the second camera, a second field-of-view. 724

Figure 7

DETACHABLE CAMERA BLOCK FOR A WEARABLE DEVICE

CROSS-REFERENCE TO RELATED APPLICATION

This application claims priority to U.S. Provisional Patent Application No. 63/049,520, filed Jul. 8, 2020, entitled "Detachable Camera Block for a Wearable Device," which is incorporated herein by reference in its entirety.

TECHNICAL FIELD

This application relates generally to cameras on wearable devices, and more specifically to wearable devices with dynamically configurable cameras.

BACKGROUND

When a wearable device or a portable device includes a camera, the camera typically has a fixed orientation and fixed focal parameters. This limits the ways in which the camera can be used.

Artificial reality often provides a rich, immersive experience in which users are able to interact with virtual objects and/or environments. In this context, artificial reality may constitute a form of reality that has been altered by virtual objects for presentation to a user. Such artificial reality may include and/or represent virtual reality (VR), augmented reality (AR), mixed reality (MR), hybrid reality, or some combination and/or variation one or more of the same. Although artificial reality systems are commonly implemented for gaming and other entertainment purposes, such systems are also implemented for purposes outside of recreation. For example, governments may use them for military training simulations, doctors may use them to practice surgery, engineers may use them as visualization aids, and co-workers may use them to facilitate inter-personal interactions and collaboration from across the globe.

Head-mounted display devices (also called head-mounted displays) are gaining popularity as a means for providing visual information to a user. For example, some head-mounted display devices are used for virtual reality and augmented reality operations.

When using head-mounted display devices, it may be desirable for the user to be able to observe the outside environment. For instance, while using the head-mounted display device, a user may want to look down at his or her hands in order to view a keyboard, a mouse, or a controller, or to interact with adjacent objects, such as grabbing a cup of tea, without having to remove the head-mounted display device. In such cases, separate cameras or wearable devices having integrated cameras can record/track the outside environment and such data can be used to aid the user and enhance the AR/VR experience.

SUMMARY

The present disclosure identifies and addresses the need for additional systems and methods for adjusting one or more camera angles to view an environment of a wearer. In some embodiments this enhances artificial reality sensory experiences.

The present disclosure generally relates to systems and methods for interchanging displays with various camera capabilities on wearable devices worn by users. In some embodiments, a system includes a wearable device to be worn by a user of an artificial reality system. The wearable device includes a strap, a base, and a display detachably coupled to the base. The display includes at least one camera, which is configured to rotate around an axis normal to the base (e.g., the axis is normal to the base and passes through the centroid of the base) to adjust the orientation of the camera with respect to the base. The base generally includes all (or most) of the electronics for the wearable device, and the base is attached to the strap.

In some embodiments, the display of the wearable device includes two or more cameras having distinctive lenses. Each lens can be a macro lens, a prime telephoto lens, an optical zoom lens, or a normal lens. This list of camera lens types is not exhaustive; other lens types may be utilized.

In some embodiments, the display of the wearable device is configured to rotate around an axis normal to the base to adjust the orientation of the camera to change the field-of-view of the camera.

In some embodiments, the display of the wearable device is a first display. The wearable device assembly further includes a second display having one or more second cameras embedded within it. The second display is also configured to detachably couple to the base. Each display is capable of attaching to the base, but not both at the same time.

In some embodiments, the base and the display of the wearable device are square shaped. In some embodiments, the base and the display of the wearable device are circular in shape. In some embodiments, the base and the display of the wearable device are rectangular in shape. In some embodiments, the base and the display of the wearable device have other shapes, but both the base and the display have the same shape. In some embodiments, the shared shape of the base and the display has a plurality of rotational symmetries around a central perpendicular axis to the display.

In some embodiments, the base of the wearable device includes one or more pads configured to electrically connect to one or more pads of the display. In some embodiments, the base of the wearable device includes one or more pads configured to electromagnetically connect to one or more pads of the display. The pads on the base and the display comprise a conductive material (e.g., metal). The pads may be spring loaded, or may be bent away from the surface in order to create strong electrical connections when the base pads touch the display pads. The pads may be arranged in various array patterns, such as the 2×3 arrays shown in FIG. 4. In some embodiments the pads are circular dots. In other embodiments, the pads are square or rectangular. In some embodiments, all of the pads within a group have the same size and shape. In some embodiments, the pads are arranged in groups, and the groups have rotational symmetry around a central axis perpendicular to the display.

In some embodiments, the pads have two or more distinct sizes and/or shapes.

In some embodiments, the display of the wearable device includes one or more pads configured to electrically connect to one or more pads of the base.

In some embodiments, the display of the wearable device includes one or more pads configured to electromagnetically connect to one or more pads of the base.

In some embodiments, the one or more pads of the base are configured to magnetically connect to one or more pads of the display.

In some embodiments, the pads of the wearable device electrically connect the display to the base at 0, 45, 90, 135, and 270 degree orientations with respect to a first orientation.

In some embodiments, the wearable device includes a wristband dimensioned to be worn on a wrist of the user.

A wearable device may be part of an artificial reality system. The artificial reality system may include one or more wearable devices and a head-mounted display (HMD).

A corresponding method utilizes a wearable device having a strap, a base coupled to the strap, and a first display coupled to the base. The first display has a first camera. The method includes (1) detaching the first display from the base and (2) attaching a second display (having a second camera) to the base. The second display is distinct from the first display. In some embodiments, the method includes (3) rotating the second display around an axis normal to the base in a first direction to capture, using the second camera, a first field-of-view and (4) rotating the second display around the axis in a second direction, distinct from the first direction to capture, using the second camera, a second field-of-view.

Various advantages of the present application will be apparent in light of the descriptions below.

BRIEF DESCRIPTION OF THE DRAWINGS

For a better understanding of the various described embodiments, reference should be made to the Detailed Description below, in conjunction with the following drawings in which like reference numerals refer to corresponding parts throughout the figures and description.

FIGS. 6A-6C illustrate display configurations of the wearable device in accordance with some embodiments.

FIG. 7 is a flow diagram of a method for interchanging displays with detachable camera blocks on a wearable device in accordance with some embodiments.

Figure 1:
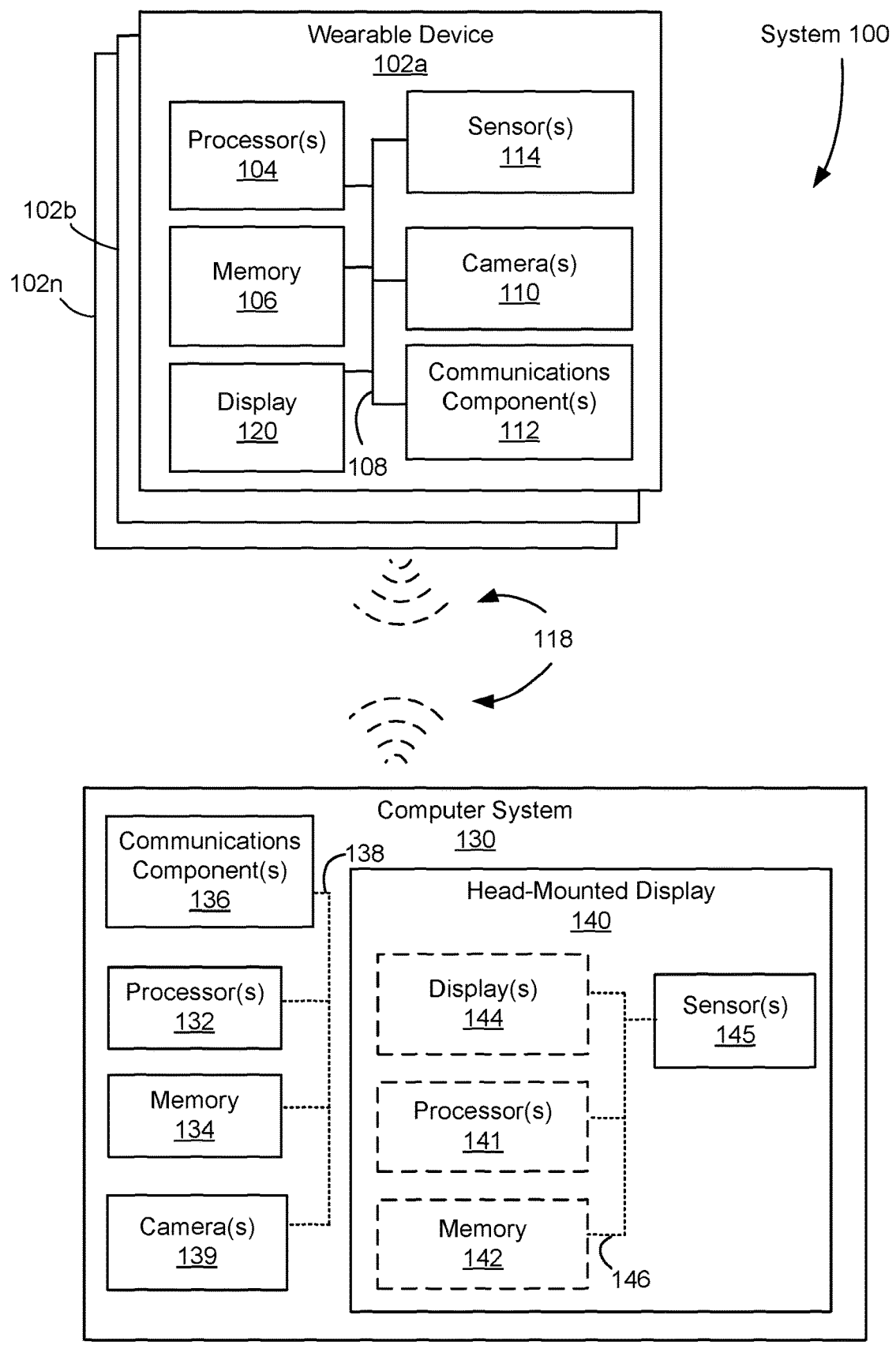
FIG. 1 is a block diagram illustrating an artificial reality system, in accordance with some embodiments.

Throughout the drawings, identical reference characters and descriptions indicate similar, but not necessarily identical, elements. While the embodiments described herein are susceptible to various modifications and alternative forms, specific embodiments have been shown by way of example in the drawings and will be described in detail herein. However, the embodiments described herein are not intended to be limited to the particular forms disclosed.

DESCRIPTION OF EMBODIMENTS

Reference will now be made to embodiments, examples of which are illustrated in the accompanying drawings. In the following description, numerous specific details are set forth in order to provide an understanding of the various described embodiments. However, it will be apparent to one of ordinary skill in the art that the various described embodiments may be practiced without these specific details. In other instances, well-known methods, procedures, components, circuits, and networks have not been described in detail so as not to unnecessarily obscure aspects of the embodiments.

It will also be understood that, although the terms "first" and "second" are sometimes used herein to describe various elements, these elements should not be limited by these terms. These terms are used only to distinguish one element from another. For example, a first display could be termed a second display, and, similarly, a second display could be termed a first display, without departing from the scope of the various described embodiments. The first display and the second display are both displays, but they are not the same display, unless specified otherwise.

The terminology used in the description of the various described embodiments herein is for the purpose of describing particular embodiments only and is not intended to be limiting. As used in the description of the various described embodiments and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, steps, operations, elements, and/or components, but do not preclude the presence or addition of one or more other features, steps, operations, elements, components, and/or groups thereof.

As used herein, the term "if" means "when" or "upon" or "in response to determining" or "in response to detecting" or "in accordance with a determination that," depending on the context. Similarly, the phrase "if it is determined" or "if [a stated condition or event] is detected" means "upon determining" or "in response to determining" or "upon detecting [the stated condition or event]" or "in response to detecting [the stated condition or event]" or "in accordance with a determination that [a stated condition or event] is detected," depending on the context.

FIG. 1 is a block diagram illustrating a system 100, in accordance with various embodiments. While some example features are illustrated, various other features have not been illustrated for the sake of brevity and so as not to obscure pertinent aspects of the example embodiments disclosed herein. To that end, as a non-limiting example, the system 100 includes one or more wearable devices 102 (e.g., the devices 102a, 102b, . . . , 102n), which are used in conjunction with a computer system 130 (e.g., a host system or a host computer). In some embodiments, the system 100 provides the functionality of a virtual reality device with haptics feedback, an augmented reality device with haptics feedback, a combination thereof, or provides some other functionality. Some embodiments of the system 100 are described in greater detail below with reference to FIGS. 8-10.

An example wearable device 102 (e.g., the wearable device 102a) includes, for example, one or more processors/cores 104 (referred to henceforth as "processors"), memory 106, one or more cameras 110, one or more communications components 112, one or more sensors 114, and/or a display 120. In some embodiments, these components are interconnected by way of a communications bus 108. References to these components of the wearable device 102 cover embodiments in which one or more of these components (and combinations thereof) are included. In some embodiments, the one or more sensors 114 are part of the one or more cameras 110.

In some embodiments, a single processor 104 (e.g., the processor 104 of a first wearable device 102a) executes software modules for controlling multiple wearable devices 102 (e.g., all of the wearable devices 102a, 102b, ..., 102n). In some embodiments, a single wearable device 102 (e.g., the wearable device 102a) includes multiple processors 104, one or more communications component processors (e.g., configured to control communications transmitted by the communications component 112 and/or receive communications by way of the communications component 112) and/or one or more sensor processors (e.g., configured to control operation of the sensors 114 and/or receive output from the sensors 114).

The computer system 130 is a computing device that may execute virtual reality applications and/or augmented reality applications to process input data from the sensors 145 on the head-mounted display 140 and the sensors 114 on the wearable device 102. The computer system 130 provides output data for (i) the electronic display 144 on the head-mounted display 140 and (ii) the wearable device 102. In some embodiments, the computer system 130 includes one or more processors/cores 132, memory 134, one or more communications components 136, and/or one or more cameras 139. In some embodiments, these components are interconnected by way of a communications bus 138. References to these components of the computer system 130 cover embodiments in which one or more of these components (and combinations thereof) are included.

In some embodiments, the computer system 130 is a standalone device that is coupled to a head-mounted display 140. For example, the computer system 130 has processors/cores 132 for controlling one or more functions of the computer system 130 and the head-mounted display 140 has processors/cores 141 for controlling one or more functions of the head-mounted display 140. Alternatively, in some embodiments, the head-mounted display 140 is a component of computer system 130. For example, the processors 132 control functions of the computer system 130 and the head-mounted display 140. In addition, in some embodiments, the head-mounted display 140 includes one or more processors 141, which communicate with the processors 132 of the computer system 130. In some embodiments, communications between the computer system 130 and the head-mounted display 140 occur via a wired connection between the communications bus 138 and the communications bus 146. In some embodiments, the computer system 130 and the head-mounted display 140 share a single communications bus. In some instances the head-mounted display 140 is separate from the computer system 130 (not shown).

The computer system 130 may be any suitable computer device, such as a laptop computer, a tablet device, a netbook computer, a personal digital assistant, a mobile phone, a smart phone, a virtual reality device (e.g., a virtual reality (VR) device, an augmented reality (AR) device, or the like), a gaming device, a computer server, or any other computing device. The computer system 130 is sometimes called a host or a host system. In some embodiments, the computer system 130 includes other user interface components such as a keyboard, a touch-screen display, a mouse, a track-pad, and/or supplemental I/O devices to add functionality to the computer system 130.

In some embodiments, the one or more cameras 139 of the computer system 130 are used to facilitate virtual reality and/or augmented reality. Moreover, in some embodiments, the one or more cameras 139 also act as projectors to display the virtual and/or augmented images. In some embodiments, the computer system includes one or more distinct projectors. In some embodiments, the computer system 130 provides images captured by the one or more cameras 139 to the display 144 of the head-mounted display 140, and the display 144 in turn displays the provided images. In some embodiments, the processors 141 of the head-mounted display 140 process the provided images. In some embodiments the one or more cameras 139 are part of the head-mounted display 140.

Figure 9:
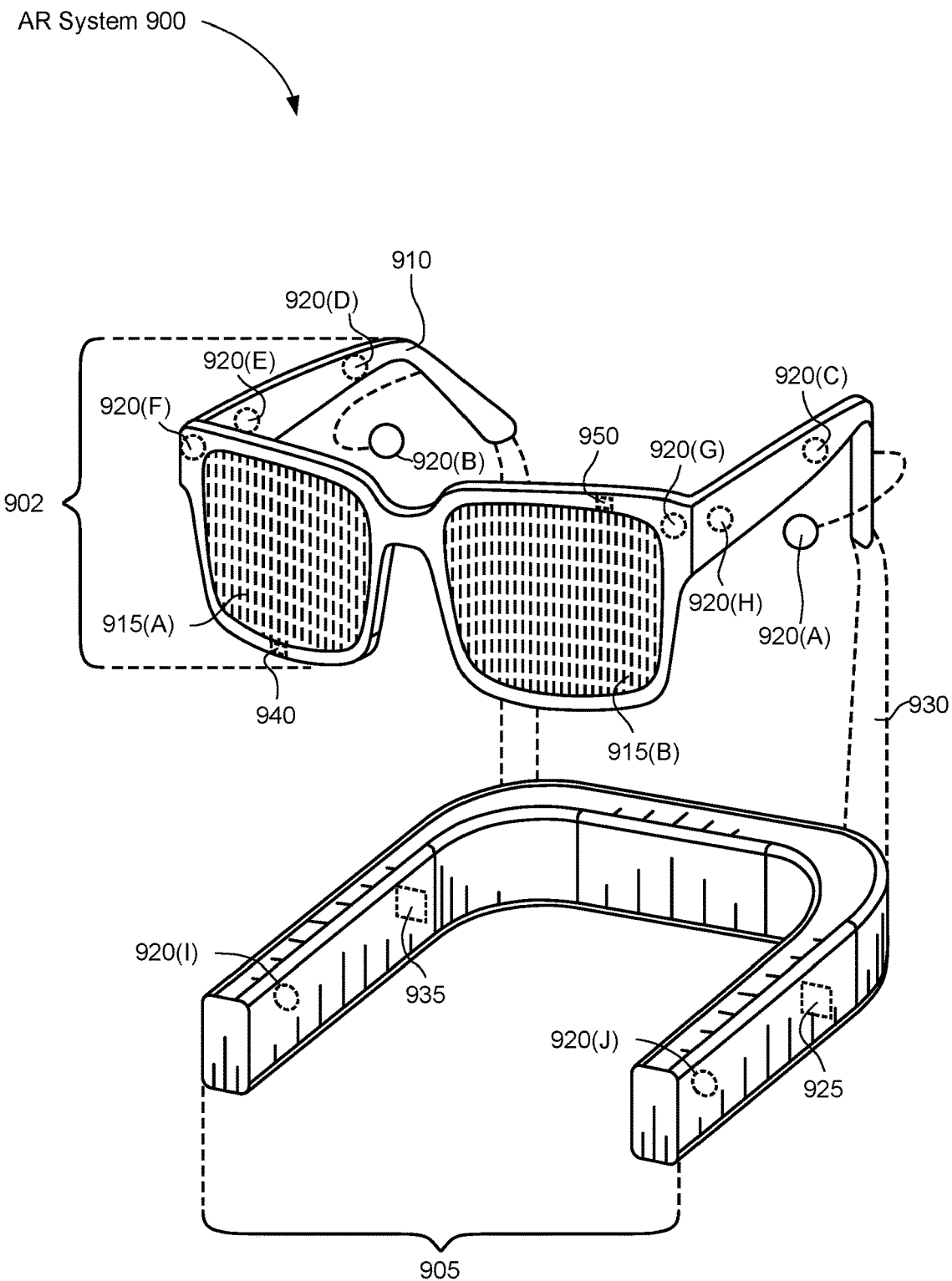
FIG. 9 illustrates an embodiment of an augmented reality headset and a corresponding neckband, in accordance with some embodiments.
Figure 10:
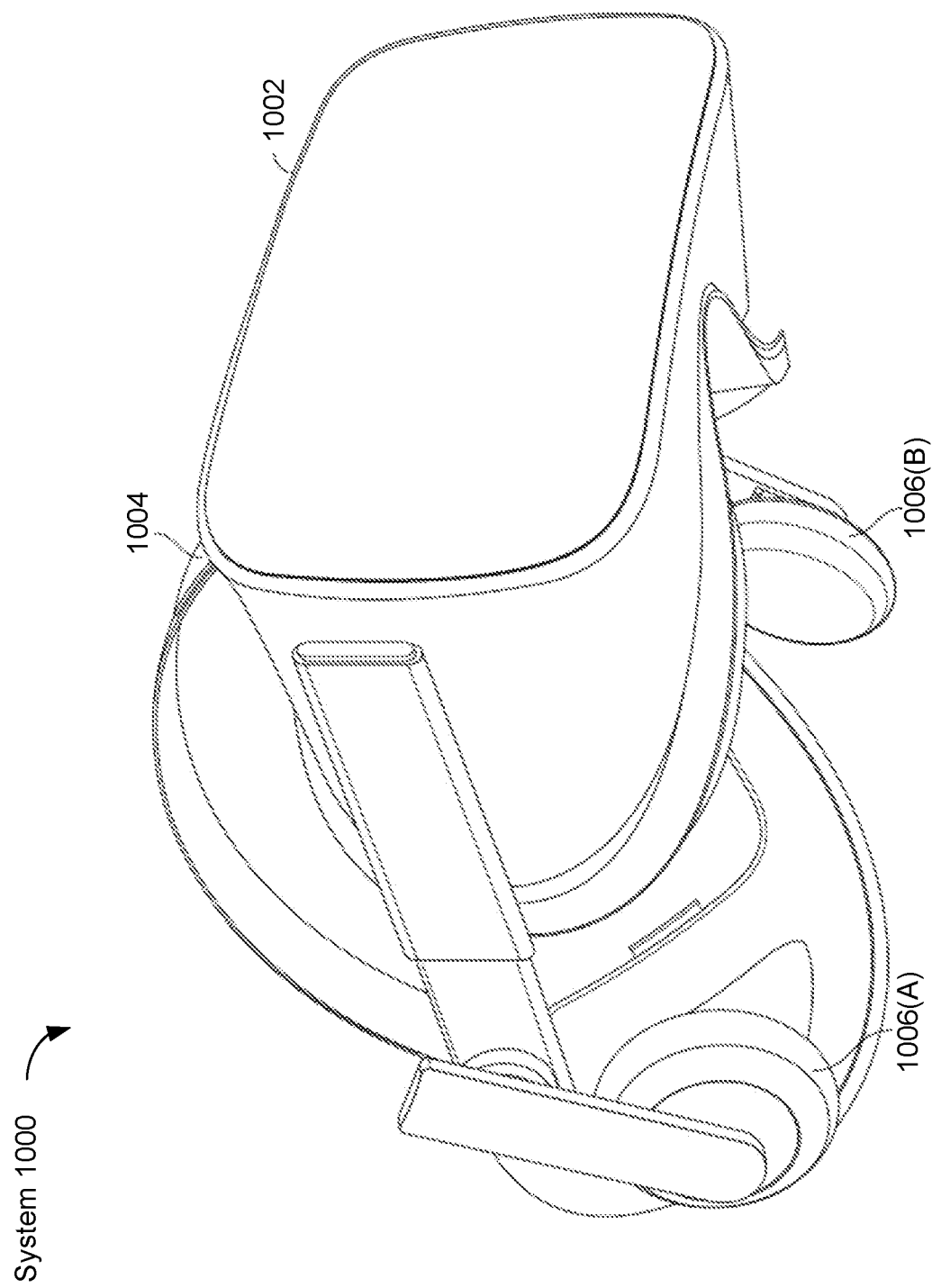
FIG. 10 illustrates an embodiment of a virtual reality headset, in accordance with some embodiments.

The head-mounted display 140 presents media to a user. Examples of media presented by the head-mounted display 140 include images, video, audio, or some combination thereof. In some embodiments, audio is presented via an external device (e.g., speakers and/or headphones) that receives audio information from the head-mounted display 140, the computer system 130, or both, and presents audio data based on the audio information. In some embodiments, the head-mounted display 140 includes one or more processors/cores 141, memory 142, and/or one or more displays 144. In some embodiments, these components are interconnected by way of a communications bus 146. References to these components of the head-mounted display 140 cover embodiments in which one or more of these components (and combinations thereof) are included. In some embodiments the head-mounted display 140 includes one or more sensors 145. Alternatively, in some embodiments, the one or more sensors 145 are part of the host system 130. FIGS. 9 and 10 illustrate additional examples (e.g., an AR system 900 and a VR system 1000) of the head-mounted display 140.

The electronic display 144 displays images to the user in accordance with data received from the computer system 130. In various embodiments, the electronic display 144 comprises a single electronic display or multiple electronic displays (e.g., one display for each eye of a user). The displayed images may be in virtual reality, augment reality, or mixed reality.

The optional sensors 145 include one or more hardware devices that detect spatial and motion information about the head-mounted display 140. Spatial and motion information can include information about the position, orientation, velocity, rotation, and acceleration of the head-mounted display 140. For example, the sensors 145 may include one or more inertial measurement units (IMUs) that detect rotation of the user's head while the user is wearing the head-mounted display 140. This rotation information can then be used (e.g., by the computer system 130) to adjust the images displayed on the electronic display 144. In some embodiments, each IMU includes one or more gyroscopes, accelerometers, and/or magnetometers to collect the spatial and motion information. In some embodiments, the sensors 145 include one or more cameras positioned on the head-mounted display 140.

The communications component 112 of the wearable device 102 includes a communications component antenna for communicating with the computer system 130. Moreover, the communications component 136 of the computer system include a complementary communications component antenna that communicates with the communications component 112 of the wearable device. The respective communication components are discussed in further detail below with reference to FIGS. 2 and 3.

In some embodiments, data contained within communication signals 118 is used by the wearable device 102 for selecting values for characteristics used by the cameras 110 to instruct the user to adjust a camera on the display of the wearable device. For example, the wearable device receives an instruction from computer system 130 to capture a video stream from a wide-angle lens. The wearable device may display a graphical user interface instructing the user to rotate the display to position the correct camera in the correct orientation (e.g., rotate the display clockwise 90 degrees). In some embodiments, the data contained within the communication signals 118 alerts the computer system 130 that the wearable device 102 is ready for use.

Non-limiting examples of the sensors 114 and the sensors 145 include infrared sensors, pyroelectric sensors, ultrasonic sensors, laser sensors, optical sensors, Doppler sensors, gyro sensors, accelerometers, resonant LC sensors, capacitive sensors, heart rate sensors, acoustic sensors, and inductive sensors. In some embodiments, the sensors 114 and/or the sensors 145 are configured to gather data that is used to determine the hand posture of a user of the wearable device and/or an impedance of the medium. Examples of sensor data output by these sensors include: body temperature data, infrared range-finder data, motion data, activity recognition data, silhouette detection and recognition data, gesture data, heart rate data, and other wearable device data (e.g., biometric readings and output, and accelerometer data).

Figure 2:
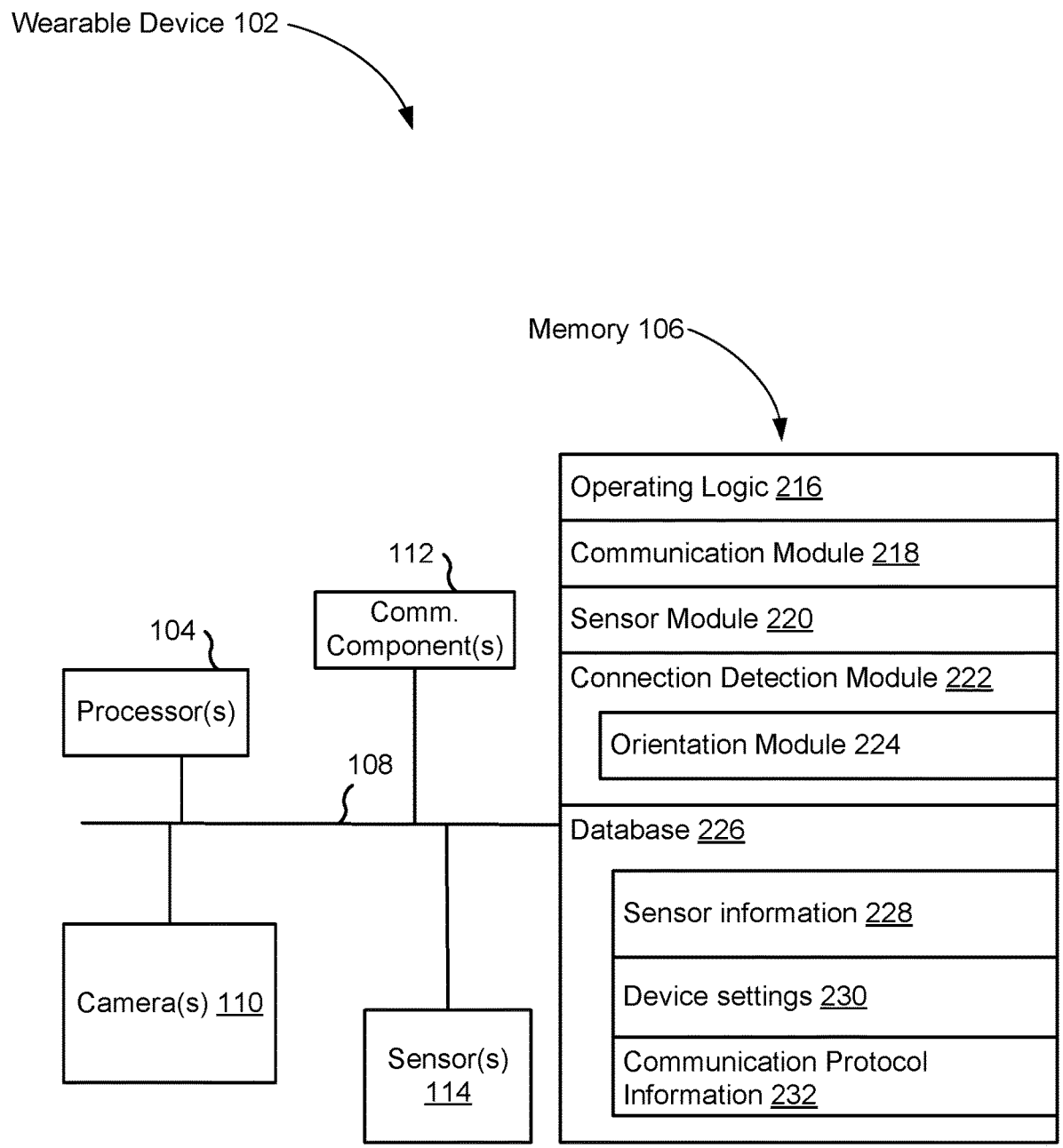
FIG. 2 is a block diagram illustrating a wearable device in accordance with some embodiments.

FIG. 2 is a block diagram illustrating a representative wearable device 102 in accordance with some embodiments. In some embodiments, the wearable device 102 includes one or more processing units 104 (e.g., CPUs, microprocessors, and the like), one or more communication components 112, memory 106, one or more cameras 110, and one or more communication buses 108 for interconnecting these components (sometimes called a chipset). In some embodiments, the wearable device 102 includes one or more sensors 114 as described above with reference to FIG. 1. In some embodiments (not shown), the wearable device 102 includes one or more output devices such as one or more indicator lights, a sound card, a speaker, or a small display for displaying textual information and error codes.

The communication components 112 enable communication between the wearable device 102 and one or more communication networks. In some embodiments, the communication components 112 include hardware capable of data communications using any of a variety of wireless protocols (e.g., IEEE 802.15.4, Wi-Fi, ZigBee, 6LoWPAN, Thread, Z-Wave, Bluetooth Smart, ISA100.11a, WirelessHART, or MiWi) wired protocols (e.g., Ethernet or HomePlug), and/or any other suitable communication protocol.

The memory 106 includes high-speed random access memory, such as DRAM, SRAM, DDR SRAM, or other random access solid state memory devices. In some embodiments, the memory includes non-volatile memory, such as one or more magnetic disk storage devices, one or more optical disk storage devices, one or more flash memory devices, or one or more other non-volatile solid state storage devices. The memory 106, or alternatively the non-volatile memory within memory 106, includes a non-transitory computer-readable storage medium. In some embodiments, the memory 106, or the non-transitory computer-readable storage medium of the memory 106, stores the following programs, modules, and data structures, or a subset or superset thereof:

operating logic 216, including procedures for handling various basic system services and for performing hardware dependent tasks;

a communication module 218, which communicates with remote devices (e.g., a computer system 130 or other wearable devices) in conjunction with communication components 112;

a sensor module 220, which obtains and processes sensor data (e.g., in conjunction with the sensors 114 and/or the cameras 110). The sensor module can determine the orientation of the wearable device 102 or determine the environmental conditions of the user of the wearable device;

a connection detection module 222, which identifies which of the multiple interchangeable displays is attached to the base of the wearable device. In some embodiments, the connection detection module 222 also includes an orientation module 224, which identifies the orientation of the attached display with respect to the base; and a database 226, which stores:
  sensor information 228 received, detected, and/or transmitted by one or more sensors 114, one or more remote sensors, and/or cameras;
  device settings 230 for the wearable device 102 and/or one or more remote devices (e.g., selected preferred orientations for the cameras); and
  communication protocol information 232 for one or more protocols (e.g., custom or standard wireless protocols, such as ZigBee or Z-Wave, and/or custom or standard wired protocols, such as Ethernet).

In some embodiments (not shown), the wearable device 102 includes a location detection device, such as a GNSS (e.g., GPS or GLONASS) or other geo-location receiver, for determining the location of the wearable device 102. In some embodiments, the wearable device 102 includes a location detection module (e.g., a GPS, Wi-Fi, magnetic, or hybrid positioning module) for determining the location of the wearable device 102 (e.g., using the location detection device) and providing this location information to the host system 130.

In some embodiments (not shown), the wearable device 102 includes a unique identifier stored in the database 226. In some embodiments, the wearable device 102 sends the unique identifier to the host system 130 to identify itself to the host system 130. This is particularly useful when multiple wearable devices are being used concurrently.

In some embodiments, the wearable device 102 includes one or more inertial measurement units (IMU) for detecting motion and/or a change in orientation of the wearable device 102. In some embodiments, the detected motion and/or orientation of the wearable device 102 (e.g., the motion/change in orientation corresponding to movement of the user's hand) is used to manipulate an interface (or content within the interface) displayed by the head-mounted display 140. In some embodiments, the IMU includes one or more gyroscopes, accelerometers, and/or magnetometers to collect IMU data. In some embodiments, the IMU measures motion and/or a change in orientation for multiple axes (e.g., three axes or six axes). In such instances, the IMU may include one or more instruments for each of the multiple axes. The one or more IMUs may be part of the one or more sensors 114.

Each of the above-identified elements (e.g., modules stored in memory 106 of the wearable device 102) can be stored in one or more of the previously mentioned memory devices, and corresponds to a set of instructions for performing the functions described above. The above identified modules or programs (e.g., sets of instructions) need not be implemented as separate software programs, procedures, or modules, and thus various subsets of these modules can be combined or otherwise rearranged in various embodiments. In some embodiments, the memory 106 stores a subset of the modules and data structures identified above. In some embodiments, the memory 106 stores additional modules and data structures not described above.

Figure 3:
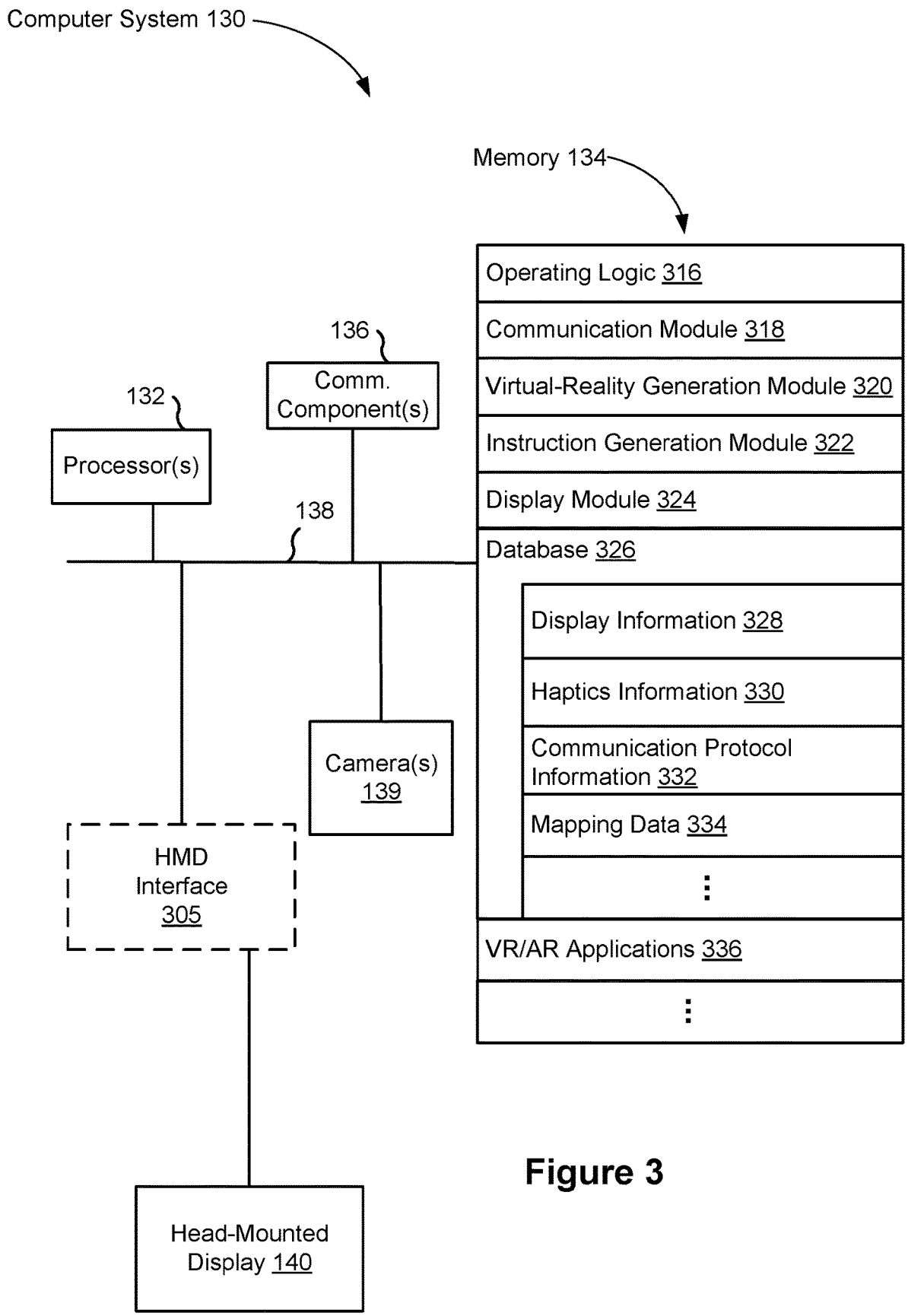
FIG. 3 is a block diagram illustrating a computer system in accordance with some embodiments.

FIG. 3 is a block diagram illustrating a representative computer system 130 in accordance with some embodiments. In some embodiments, the computer system 130 includes one or more processing units/cores 132 (e.g., CPUs, GPUs, microprocessors, and the like), one or more communication components 136, memory 134, one or more cameras 139, and one or more communication buses 138 for interconnecting these components (sometimes called a chipset). In some embodiments, the computer system 130 includes a head-mounted display interface 305 for connecting the computer system 130 with the head-mounted display 140. As discussed above in FIG. 1, in some embodiments, the computer system 130 and the head-mounted display 140 are together in a single device, whereas in other embodiments the computer system 130 and the head-mounted display 140 are separate from one another.

Although not shown, in some embodiments, the computer system (and/or the head-mounted display 140) includes one or more sensors 145 (as discussed above with reference to FIG. 1).

The communication components 136 enable communication between the computer system 130 and one or more communication networks. In some embodiments, the communication components 136 include hardware capable of data communications using any of a variety of custom or standard wireless protocols (e.g., IEEE 802.15.4, Wi-Fi, ZigBee, 6LoWPAN, Thread, Z-Wave, Bluetooth Smart, ISA100.11a, WirelessHART, or MiWi) custom or standard wired protocols (e.g., Ethernet or HomePlug), and/or any other suitable communication protocol.

The memory 134 includes high-speed random access memory, such as DRAM, SRAM, DDR SRAM, or other random access solid state memory devices. In some embodiments, the memory includes non-volatile memory, such as one or more magnetic disk storage devices, one or more optical disk storage devices, one or more flash memory devices, or one or more other non-volatile solid state storage devices. The memory 134, or alternatively the non-volatile memory within memory 134, includes a non-transitory computer-readable storage medium. In some embodiments, the memory 134, or the non-transitory computer-readable storage medium of the memory 134, stores the following programs, modules, and data structures, or a subset or superset thereof:

operating logic 316, including procedures for handling various basic system services and for performing hardware dependent tasks;

a communication module 318, which communicates with remote devices (e.g., the wearable devices 102a, ..., 102-n, or a remote server (not shown)) in conjunction with communication components 136;

a virtual-reality generation module 320, which is used for generating virtual-reality images and sending corresponding video and audio data to the HMD 140. In some embodiments, the virtual-reality generation module 320 is an augmented-reality generation module 320 (or the memory 134 includes a distinct augmented-reality generation module), which is used for generating augmented-reality images and projecting those images in conjunction with the cameras 139 and the HMD 140);

an instruction generation module 322, which is used for generating an instruction that, when sent to the wearable device 102 (e.g., using the communications component 136), causes the wearable device 102 to instruct the user to adjust a display orientation (e.g., rotate the display to use a different camera) and/or interchange the entire display;

a display module 324, which displays virtual-reality images and/or augmented-reality images in conjunction with the head-mounted display 140 and/or the cameras 139;

a database 326, which stores:
display information 328, including virtual-reality images and/or augmented-reality images (e.g., visual data);
haptics information 330, corresponding to the stored virtual-reality images and/or augmented-reality images;
communication protocol information 332 for one or more protocols (e.g., custom or standard wireless protocols, such as ZigBee or Z-Wave, and/or custom or standard wired protocols, such as Ethernet); and
mapping data 334, including geographic maps.

In the example shown in FIG. 3, the computer system 130 further includes virtual-reality (and/or augmented-reality) applications 336. In some embodiments, the virtual-reality applications 336 are implemented as software modules that are stored on the storage device and executed by the processor. Each virtual-reality application 336 is a group of instructions that, when executed by a processor, generates virtual reality content for presentation to the user. A virtual-reality application 336 may generate virtual-reality content in response to inputs received from the user via movement of the head-mounted display 140 or the wearable device 102. Examples of virtual-reality applications 336 include gaming applications, conferencing applications, and video playback applications.

The virtual-reality generation module 320 is a software module that allows virtual-reality applications 336 to operate in conjunction with the head-mounted display 140 and the wearable device 102. The virtual-reality generation module 320 may receive information from the sensors 145 on the head-mounted display 140 and may, in turn provide the information to a virtual-reality application 336. Based on the received information, the virtual-reality generation module 320 determines media content to provide to the head-mounted display 140 for presentation to the user via the electronic display 144. For example, if the virtual-reality generation module 320 receives information from the sensors 145 on the head-mounted display 140 indicating that the user has looked to the left, the virtual-reality generation module 320 generates content for the head-mounted display 140 that mirrors the user's movement in a virtual environment.

Similarly, in some embodiments, the virtual-reality generation module 320 receives information from the sensors 114 on the wearable device 102 and provides the information to a virtual-reality application 336. The application 336 can use the information to perform an action within the virtual world of the application 336. For example, if the virtual-reality generation module 320 receives information from the sensors 114 and/or cameras 110, 139 that the user has raised his hand, a simulated hand (e.g., the user's avatar) in the virtual-reality application 336 lifts to a corresponding height. As noted above, the information received by the virtual-reality generation module 320 can also include information from the head-mounted display 140. For example, the cameras 139 on the head-mounted display 140 may capture movements of the user (e.g., movement of the user's arm), and the application 336 can use this additional information to perform the action within the virtual world of the application 336.

To further illustrate with an augmented reality example, if the augmented-reality generation module 320 receives information from the sensors 114, the cameras 110, and/or the cameras 139, the content in the head-mounted display updates accordingly. When the information indicates that the user has rotated his forearm while a user interface (e.g., a keypad) is displayed on the user's forearm, the augmented-reality generation module 320 generates content for the head-mounted display 140 that mirrors the user's movement in the augmented environment (e.g., the user interface rotates in accordance with the rotation of the user's forearm).

Each of the above identified elements (e.g., the modules stored in the memory 134 of the computer system 130) can be stored in one or more of the previously mentioned memory devices, and corresponds to a set of instructions for performing the function(s) described above. The above identified modules or programs (e.g., sets of instructions) need not be implemented as separate software programs, procedures, or modules, and thus various subsets of these modules can be combined or otherwise rearranged in various embodiments. In some embodiments, the memory 134 stores a subset of the modules and data structures identified above.

Figure 4:
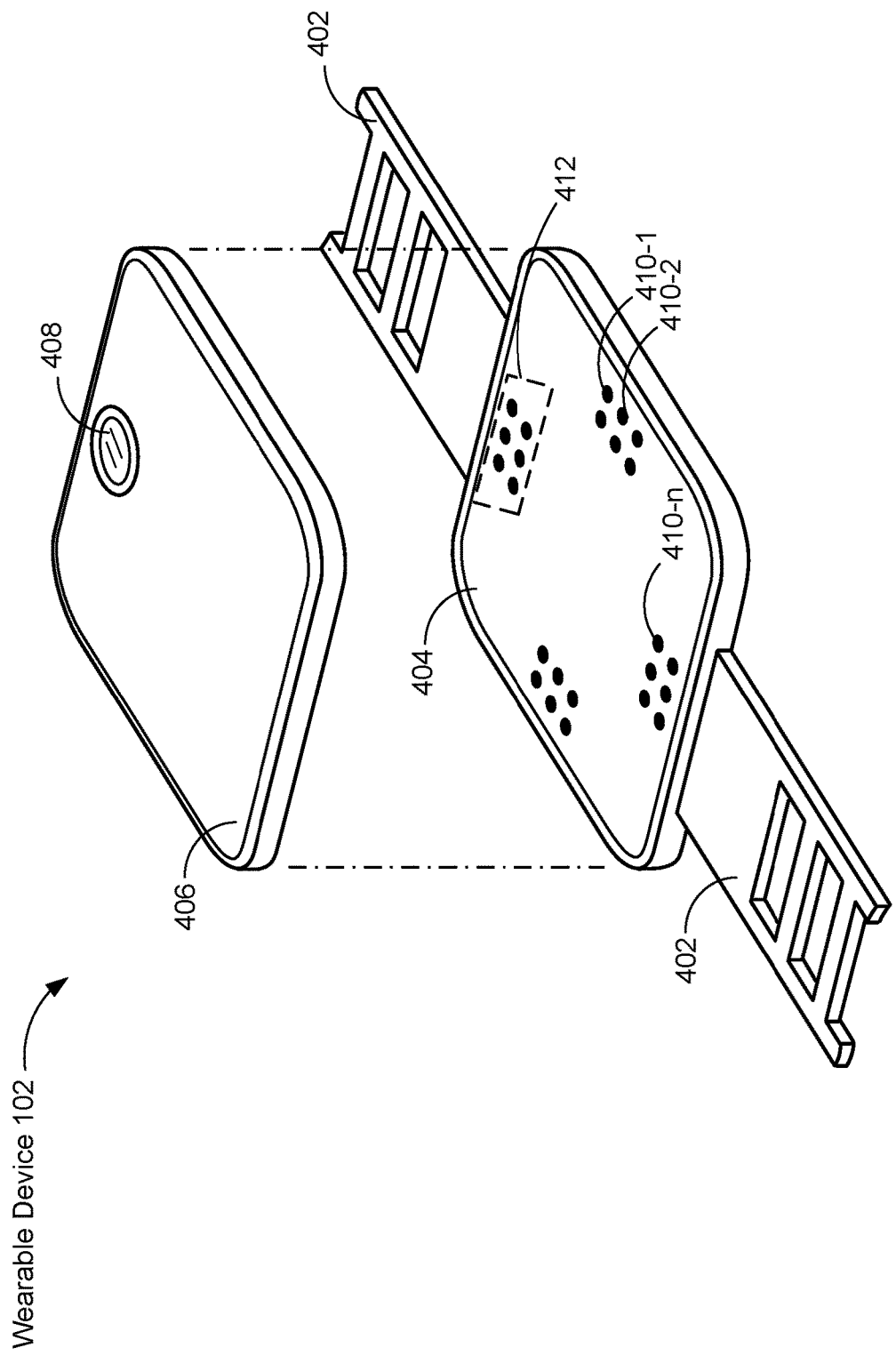
FIG. 4 is an exploded view of a wearable device with a detachable camera block, in accordance with some embodiments.

FIG. 4 is a view of a wearable device 102 with a detachable camera block in accordance with some embodiments. The wearable device 102 includes a strap 402, a base 404 coupled to the strap 402, and a display 406 having a camera 408. The display 406 is shown detached from the base 404, but it is typically coupled to the base 404. In some embodiments, the display 406 is an electronic display configured to display a graphical user interface. The base 404 includes one or more pads 410-1 to 410-n distributed in sections (e.g., a first section 412) about a surface of the base 404. The wearable device 102 may include multiple sections 412, each having one or more pads 410. The pads 410 may be made of a conductive metallic element to electrically, electromagnetically, and/or magnetically connect to one or more corresponding pads (not shown) on the side of the display 406 configured to connect to the base 404 (e.g., pads on an opposite side of the display from the side having the one or more embedded cameras). Some embodiments include one or more mechanical locking mechanisms (not shown) to affix the display 406 to the base or the strap to provide an additional layer of connection between the display 406 and the base 404.

In some embodiments, the base 404 includes multiple sections of pads, such as the first section 412. The illustrated embodiment includes four sections, each with six pads 410 arranged in a 2×3 array. In some embodiments, the underside of the display 406 includes a single section 412 of pads 410, and the orientation of the display 406 with respect to the base 404 determines which section of pads 410 from the base 404 connects to the pads on the display. In the illustrated embodiment, there are four possible orientations of the display 406 with respect to the base 404 (i.e., at 0°, 90°, 180°, and 270°). In the depicted embodiment, only the pads 410 from a single section are used at any given time, but other embodiments have one or more pads 410 that are shared and/or pads 410 that are not part of a section. For example, some embodiments include one or more central pads 410 that connect the base 404 to the display 406 in all possible orientations.

Having a detachable display 406 provides some flexibility for the electrical components of the wearable device 102. In some embodiments, substantially all of the electronic components are included in the base 404, and the detachable display 406 is just a "display" with one or more cameras 408. In other embodiments, some of the electrical components are included in the display 406. For example, the electrical components in the display 406 may include one or more image buffers for the cameras 408 or image processing circuitry.

Rotation of the display 406 with respect to the base 404 refers to rotation about an axis normal to both the base 404 and the display 406 (e.g., an axis normal to the base 404 extending through the centroid of the base 404, which would generally extend through the centroid of the display 406 as well).

In some embodiments, detaching the display 406 from the base 404 is necessary in order to rotate the display 406 (e.g., detach, rotate, attach). In other embodiments, the display 406 can be rotated with respect to the base 404 without detachment (e.g., a wearable device 102 with a single display 406 that can be rotated to a plurality of distinct orientations). In some embodiments, there are a finite number of distinct possible orientations, and a magnetic or mechanical locking mechanism to hold the display 406 at a selected orientation unless sufficient user force is applied. Some embodiments provide for a continuous range of rotational orientations (e.g., using annular or partially annular pads 410 on either the base 404 or the display 406). Some embodiments provide for both rotation without detachment as well as rotation with detachment. When detached, the user can also substitute an alternative display 406 (e.g., with different cameras 408).

Figure 5:
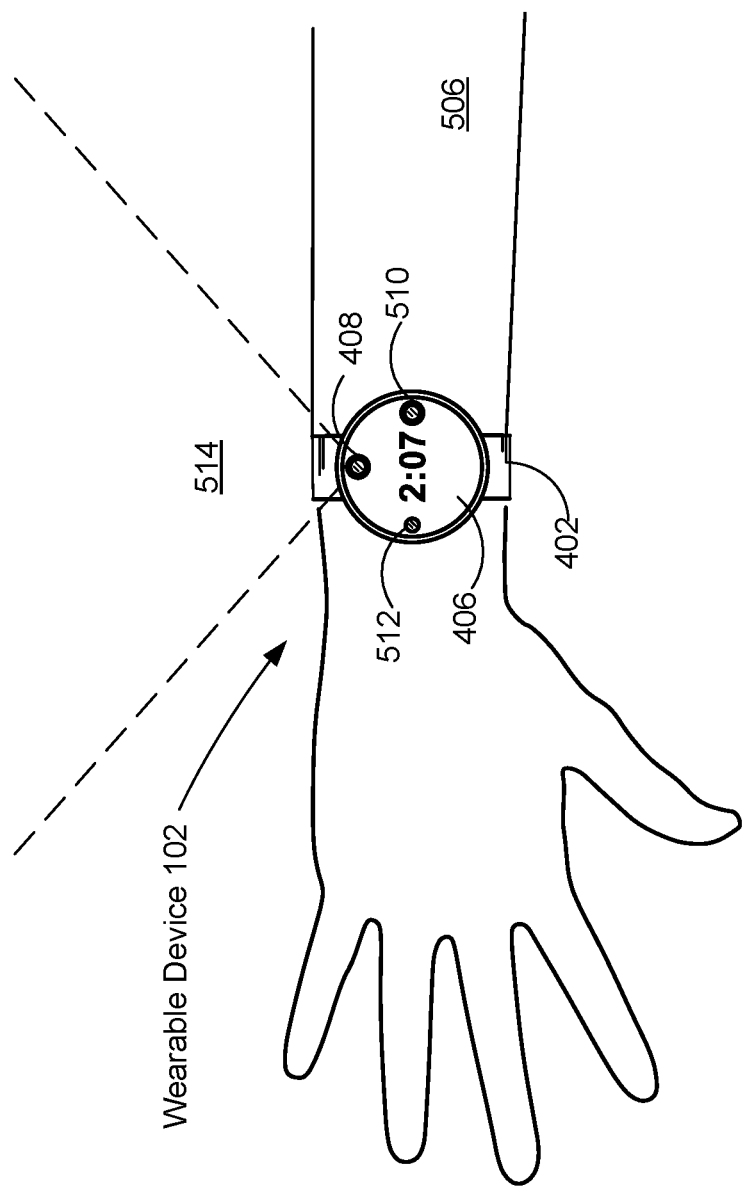
FIG. 5 is a view of a wearable device on a user's wrist, in accordance with some embodiments.

FIG. 5 is a view of a wearable device 102 affixed to a user in accordance with some embodiments. The wearable device 102 is shown with respect to a user's arm 506. In some embodiments, the wearable device 102 includes three cameras 408, 510, and 512, each with a distinct lens. In some embodiments, the camera 408 is activated to provide a field-of-view 514. In some embodiments, the camera at a 12 o'clock position is the only camera that is able to be activated. For example, if the user wants to select the camera 512, the display 406 must be rotated from the 9 o'clock position to the 12 o'clock position by either a clockwise or counterclockwise rotation. In some embodiments, the display can be rotated while attached to the base 404. In other embodiments, the display 406 must be detached (as shown in FIG. 4) in order to rotate the display.

The wearable device 102 may include a fastener that facilitates securing the strap 402 to the wrist of the user. For example, the fastener may interface with a receptacle formed integrally into the strap 402. In this example, when the strap 402 encompasses the wrist of the user and the fastener is secured to the receptacle, the combination of the fastener and the receptacle effectively hold the strap 402 in place on the wrist of the user. Examples of such fasteners include, without limitation, members, pegs, pins, clamps, clips, latches, snaps, zippers, rivets, hook and loop combinations, combinations or variations of one or more of the same, and/or other suitable fasteners.

In some examples, a user may don multiple wearable devices that work in conjunction with one another. For example, the user may wear one wearable on his or her left wrist and another wearable on his or her right wrist. In this example, the wearable on the user's left wrist may be used to capture images/video footage of the user's environment (e.g., via a wide-angle lens) while the wearable device on the user's right wrist may be used to capture images/video footage of the user (e.g., via a selfie camera).

FIGS. 6A-6C are views of a wearable device with a detachable camera block in accordance with some embodiments. The wearable device 102-2 as shown in FIGS. 6A-6C may have round or circular displays 406. Wearable devices 102 may include two or more distinct cameras, each camera having a lens with a distinct capability. For example, the first camera lens 608-1 on the wearable device 102-2 may be a prime telephoto lens, the second camera lens 608-2 may be a normal lens, and the third camera lens 608-3 may be an optical zoom lens or a fisheye lens. To select a camera for use, the display is rotated to adjust the position of the desired camera to the 12 o'clock position, with respect to the base of the wearable device 102. As shown in FIG. 6A, the second camera lens 608-2 is selected and in position for use by the user. As shown in FIG. 6B, the first camera lens 608-1 is selected and in position for use by the user. As shown in FIG. 6C, the third camera lens 608-3 is selected and in position for use by the user.

In some embodiments, each of the first camera lens 608-1, the second camera lens 608-2, and the third camera lens 608-3 is a macro lens, a prime telephoto lens, an optical zoom lens, or a normal lens.

In some embodiments, one or more of the cameras may be mounted on an outer edge of the display 406 (not shown). In such a configuration, the display may be rotated to select a camera for use. In some embodiments, the wearable device has an axial-symmetric design to allow maximum freedom in orientation positions. In some embodiments, more than one camera may be activated concurrently. In FIGS. 6A-6C, the 12 o'clock position is designated as the location for the active camera/lens. Other embodiments designate a different location as the active location. In some embodiments, the base includes an active "region" rather than a single active location, and whichever camera is in the active region becomes the active camera. In some embodiments, the active camera is selected by software rather than by hardware movement. Some embodiments use alternative means to electrically connect the display to the base (other than dot-like pads). Some embodiments use alternative techniques to electromagnetically connect the display to the base. For example, some embodiments use connecting arcs (e.g., metal arcs curving partially around a central point of the base or the display), which enable connection over a broader range of angles.

FIG. 7 is a flow diagram of a method 700 of adjusting camera blocks for a wearable device in accordance with some embodiments. The steps of the method 700 may be performed by a wearable device 102. FIG. 7 corresponds to instructions stored in computer memory or a computer readable storage medium (e.g., the memory 106 of the wearable device 102). For example, the operations of method 700 are performed, at least in part, by a communication module 218, a connection detection module 222, and/or virtual-reality generation module 320.

The method 700 includes providing (702) a wearable device that has a strap, a base coupled to the strap, and a first display coupled to the base. The first display has a first camera. In some embodiments, the base includes (704) one or more pads configured to electrically connect to one or more pads of the display. In some embodiments, the display includes (706) one or more pads configured to electrically connect to one or more pads of the base. In some embodiments, the one or more pads of the base are (708) further configured to magnetically adhere to one or more pads of the display based on magnetic coupling between the pads of the display and the pads of the base (see FIG. 4). For example, the display may have one or more magnetic pads that are configured to attach to one or more magnetic pads on the base using an electromagnetic connection. Additionally and/or alternatively, the magnetic pads may be permanent magnets. In some embodiments, the one or more pads are configured to be connected to one or more pads of the base by optical data transfer. In some embodiments, the base includes one or more pads configured to electromagnetically connect to one or more pads of the display. In some embodiments, the one or more pads of the base are configured to mechanically adhere to one or more pads of the display based on mechanical coupling between the pads of the display and the pads of the base. In some embodiments, the one or more pads of the base are configured to electromagnetically adhere to one or more pads of the display based on mechanical coupling between the pads of the display and the pads of the base.

In some embodiments, the method includes lifting the first display to detach it from the base. The method includes detaching (710) the first display from the base and attaching (712) a second display to the base. The second display is distinct from the first display and has a second camera. For example, a user wants to use a wide-angle lens to capture the environment. However, the first display does not have a camera with a wide-angle lens. The user can detach the first display in order to attach a second display having a camera with the desired wide-angle lens.

In some embodiments, the second display includes (714) two or more cameras having distinct lenses. In some embodiments, each of the lenses of the first and second cameras is (716) one of: a macro lens, a prime telephoto lens, an optical zoom lens, or a normal lens.

In some embodiments, the first and second displays are (718) both configured to make electrical connection between the one or more pads of the respective display with the one or more pads of the base at any of a set of predetermined rotational orientations of the display with respect to the base. In some embodiments, the one or more pads electrically, electromagnetically, and/or magnetically adhere (720) the display to the base at 0, 45, 90, 135, and 270 degree orientations with respect to a first orientation. In some embodiments, the one or more pads electrically, electromagnetically, and/or magnetically adhere the display to the base at any degree orientation between 0 and 360 degree orientations with respect to the base. For example, a user can select a specific orientation of the display to allow a camera within the display to sit at a specific orientation (see FIG. 5). The magnetic connection is strong enough to hold the base and the display together, but the magnetic force is able to be overcome by a user to either (1) remove and replace the display or (2) rotate the display around an axis normal to the base. In some embodiments, a secondary mechanical mechanism is locked in place and thereby holds the base and the display together. In some embodiments, the lock is overcome by a user to either (1) remove and replace the display or (2) rotate the display around an axis normal to the base.

In some embodiments, the method includes rotating (722) the second display around an axis normal to the base in a first direction to capture, using the second camera, a first field-of-view. In some embodiments, one of the two or more cameras of the second display is used to capture the first field-of-view.

In some embodiments, the method includes rotating (724) the second display around the axis in a second direction, distinct from the first direction, to capture, using the second camera, a second field-of-view. In some embodiments, the method includes rotating the second display around the axis in either the first direction or the second direction to capture, using at least one of the two or more cameras of the second display, a third field-of-view.

For example, a user has a first display having a first camera on a wearable device worn on the wrist. The user uses the first camera to take a picture of herself (e.g., a selfie) and subsequently would like to take a picture of the landscape in front of her. The user removes the first display and attaches a second display having a second camera with a wide-angle lens capability. The user is then able to use the second camera lens to take a picture of the landscape. Additionally, the user is able to rotate the second display to select a zoom lens to take a third picture that is zoomed into a specific target within the landscape. In some embodiments, the wearable device is able to be worn and used distinct from a virtual-reality and/or artificial reality system. For example, a user may wear the wearable device 102 to connect with a virtual-reality system (e.g., Oculus Rift), to provide visual and environmental feedback for use in the virtual-reality system. Additionally, the user may continue wearing wearable device 102 as a smart-watch, distinct from the virtual-reality system. The wearable device may be capable of pairing to another electronic device (e.g., a user's cell phone).

Figure 8:
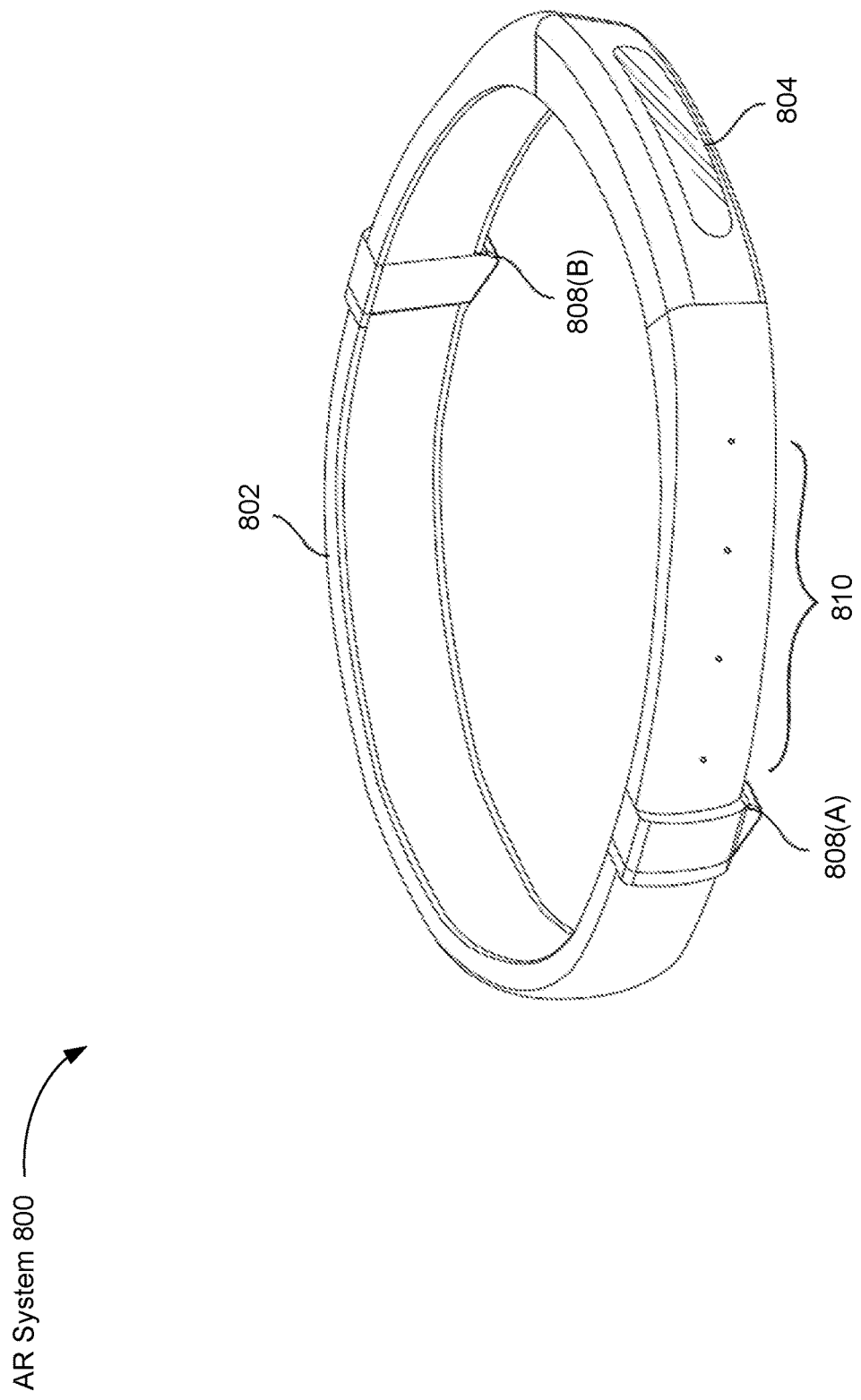
FIG. 8 illustrates an embodiment of an artificial reality device.

FIGS. 8-10 provide additional examples of the devices used in the system 100. The AR system 800 in FIG. 8 generally represents a wearable device dimensioned to fit about a body part (e.g., a head) of a user. The AR system 800 may include the functionality of the wearable device 102, and may include additional functions. As shown, the AR system 800 includes a frame 802 (e.g., band) and a camera assembly 804 that is coupled to the frame 802 and configured to gather information about a local environment by observing the local environment. The AR system 800 may also include one or more transducers. In one example, the AR system 800 includes output transducers 808(A) and 808(B) and input transducers 810. The output transducers 808(A) and 808(B) may provide audio feedback, haptic feedback, and/or content to a user, and the input audio transducers may capture audio (or other signals/waves) in a user's environment. The transducers of the AR system 800 may be configured to generate waves for creating haptic stimulations.

The AR system 800 does not include a near-eye display (NED) positioned in front of a user's eyes. AR systems without NEDs may take a variety of forms, such as head bands, hats, hair bands, belts, watches, wrist bands, ankle bands, rings, neckbands, necklaces, chest bands, eyewear frames, and/or any other suitable type or form of apparatus. While the AR system 800 may not include a NED, the AR system 800 may include other types of screens or visual feedback devices (e.g., a display screen integrated into a side of the frame 802).

The embodiments discussed in this disclosure may also be implemented in AR systems that include one or more NEDs. For example, as shown in FIG. 9, the AR system 900 may include an eyewear device 902 with a frame 910 configured to hold a right display device 915(A) and a left display device 915(B) in front of a user's eyes. Display devices 915(A) and 915(B) may act together or independently to present an image or series of images to a user. While the AR system 900 includes two displays, embodiments of this disclosure may be implemented in AR systems with a single NED or more than two NEDs.

In some embodiments, the AR system 900 includes one or more sensors, such as the sensor 940 and the sensor 950. The sensors 940 and 950 may generate measurement signals in response to motion of the AR system 900 and may be located on substantially any portion of the frame 910. The sensors 940 and 950 may include a position sensor, an inertial measurement unit (IMU), a depth camera assembly, or any combination thereof. The AR system 900 may or may not include the sensors 940 and 950 or may include more sensors. In embodiments in which the sensors 940 and 950 include an IMU, the IMU may generate calibration data based on measurement signals from the sensors 940 and 950. Examples of the sensors 940 and 950 include, without limitation, accelerometers, gyroscopes, magnetometers, other suitable types of sensors that detect motion, sensors used for error correction of the IMU, or some combination thereof. Sensors are also discussed above with reference to FIG. 1 (e.g., sensors 145 of the head-mounted display 140).

The AR system 900 may also include a microphone array with a plurality of acoustic sensors 920(A)-920(J), referred to collectively as acoustic sensors 920. The acoustic sensors 920 may be transducers that detect air pressure variations induced by sound waves. Each acoustic sensor 920 may be configured to detect sound and convert the detected sound into an electronic format (e.g., an analog or digital format). The microphone array in FIG. 14 may include, for example, ten acoustic sensors: 920(A) and 920(B), which may be designed to be placed inside a corresponding ear of the user, acoustic sensors 920(C), 920(D), 920(E), 920(F), 920(G), and 920(H), which may be positioned at various locations on the frame 910, and/or acoustic sensors 920(I) and 920(J), which may be positioned on a corresponding neckband 905. In some embodiments, the neckband 905 is an example of the computer system 130.

The configuration of acoustic sensors 920 of the microphone array may vary. While the AR system 900 is shown in FIG. 9 as having ten acoustic sensors 920, the number of acoustic sensors 920 may be greater or less than ten. In some embodiments, using more acoustic sensors 920 may increase the amount of audio information collected and/or the sensitivity and accuracy of the audio information. In contrast, using a lower number of acoustic sensors 920 may decrease the computing power required by a controller 925 to process the collected audio information. In addition, the position of each acoustic sensor 920 of the microphone array may vary. For example, the position of an acoustic sensor 920 may include a defined position on the user, a defined coordinate on the frame 910, an orientation associated with each acoustic sensor, or some combination thereof.

Acoustic sensors 920(A) and 920(B) may be positioned on different parts of the user's ear, such as behind the pinna or within the auricle or fossa. In some embodiments, there are additional acoustic sensors on or surrounding the ear in addition to acoustic sensors 920 inside the ear canal. Having an acoustic sensor positioned next to an ear canal of a user may enable the microphone array to collect information on how sounds arrive at the ear canal. By positioning at least two of acoustic sensors 920 on either side of a user's head (e.g., as binaural microphones), the AR device 900 can simulate binaural hearing and capture a 3D stereo sound field around about a user's head. In some embodiments, the acoustic sensors 920(A) and 920(B) are connected to the AR system 900 via a wired connection, and in other embodiments, the acoustic sensors 920(A) and 920(B) are connected to the AR system 900 via a wireless connection (e.g., a Bluetooth connection). In still other embodiments, the acoustic sensors 920(A) and 920(B) are not used at all in conjunction with the AR system 900.

The acoustic sensors 920 on the frame 910 may be positioned along the length of the temples, across the bridge, above or below the display devices 915(A) and 915(B), or some combination thereof. The acoustic sensors 920 may be oriented such that the microphone array is able to detect sounds in a wide range of directions surrounding the user wearing the AR system 900. In some embodiments, an optimization process may be performed during manufacturing of the AR system 900 to determine relative positioning of each acoustic sensor 920 in the microphone array.

The AR system 900 may further include or be connected to an external device (e.g., a paired device), such as a neckband 905. As shown, the neckband 905 may be coupled to the eyewear device 902 via one or more connectors 930. The connectors 930 may be wired or wireless connectors and may include electrical and/or non-electrical (e.g., structural) components. In some cases, the eyewear device 902 and the neckband 905 operate independently without any wired or wireless connection between them. While FIG. 9 illustrates the components of the eyewear device 902 and the neckband 905 in example locations on the eyewear device 902 and the neckband 905, the components may be located elsewhere and/or distributed differently on the eyewear device 902 and/or the neckband 905. In some embodiments, the components of the eyewear device 902 and the neckband 905 may be located on one or more additional peripheral devices paired with the eyewear device 902, the neckband 905, or some combination thereof. Furthermore, the neckband 905 generally represents any type or form of paired device. Thus, the following discussion of neckband 905 may also apply to various other paired devices, such as smart watches, smart phones, wrist bands, other wearable devices, hand-held controllers, tablet computers, or laptop computers.

Pairing external devices, such as a neckband 905, with AR eyewear devices may enable the eyewear devices to achieve the form factor of a pair of glasses while still providing sufficient battery and computation power for expanded capabilities. Some or all of the battery power, computational resources, and/or additional features of the AR system 900 may be provided by a paired device or shared between a paired device and an eyewear device, thus reducing the weight, heat profile, and form factor of the eyewear device overall while still retaining desired functionality. For example, the neckband 905 may allow components that would otherwise be included on an eyewear device to be included in the neckband 905, since users may tolerate a heavier weight load on their shoulders than they would tolerate on their heads. The neckband 905 may also have a larger surface area over which to diffuse and disperse heat to the ambient environment. Thus, the neckband 905 may allow for greater battery and computation capacity than might otherwise have been possible on a stand-alone eyewear device. Since weight carried in the neckband 905 may be less invasive to a user than weight carried in the eyewear device 902, a user may tolerate wearing a lighter eyewear device and carrying or wearing the paired device for greater lengths of time than the user would tolerate wearing a heavy standalone eyewear device, thereby enabling an artificial reality environment to be incorporated more fully into a user's day-to-day activities.

The neckband 905 may be communicatively coupled with the eyewear device 902 and/or to other devices. The other devices may provide certain functions (e.g., tracking, localizing, depth mapping, processing, or storage) to the AR system 900. In the embodiment of FIG. 9, the neckband 905 may include two acoustic sensors (e.g., 920(I) and 920(J)) that are part of the microphone array (or potentially form their own microphone subarray). The neckband 905 may also include a controller 925 and a power source 935.

The acoustic sensors 920(I) and 920(J) of the neckband 905 may be configured to detect sound and convert the detected sound into an electronic format (analog or digital). In the embodiment of FIG. 9, the acoustic sensors 920(I) and 920(J) may be positioned on the neckband 905, thereby increasing the distance between neckband acoustic sensors 920(I) and 920(J) and other acoustic sensors 920 positioned on the eyewear device 902. In some cases, increasing the distance between the acoustic sensors 920 of the microphone array improves the accuracy of beamforming performed via the microphone array. For example, if a sound is detected by the acoustic sensors 920(C) and 920(D) and the distance between the acoustic sensors 920(C) and 920(D) is greater than the distance between the acoustic sensors 920(D) and 920(E), the determined source location of the detected sound may be more accurate than if the sound had been detected by acoustic sensors 920(D) and 920(E).

The controller 925 of the neckband 905 may process information generated by the sensors on the neckband 905 and/or the AR system 900. For example, the controller 925 may process information from the microphone array that describes sounds detected by the microphone array. For each detected sound, the controller 925 may perform a direction of arrival (DOA) estimation to estimate a direction from which the detected sound arrived at the microphone array. As the microphone array detects sounds, the controller 925 may populate an audio data set with the information. In embodiments in which the AR system 900 includes an IMU, the controller 925 may compute all inertial and spatial calculations from the IMU located on the eyewear device 902. The connector 930 may convey information between the AR system 900 and the neckband 905 and between the AR system 900 and the controller 925. The information may be in the form of optical data, electrical data, wireless data, or any other transmittable data form. Moving the processing of information generated by the AR system 900 to the neckband 905 may reduce weight and heat in eyewear device 902, making it more comfortable to a user.

The power source 935 in the neckband 905 may provide power to the eyewear device 902 and/or to the neckband 905. The power source 935 may include, without limitation, lithium-ion batteries, lithium-polymer batteries, primary lithium batteries, alkaline batteries, or any other form of power storage. In some cases, the power source 935 is a wired power source. Including the power source 935 on the neckband 905 instead of on the eyewear device 902 better distributes the weight and heat generated by the power source 935.

As noted, some artificial reality systems may, instead of blending an artificial reality with actual reality, substantially replace one or more of a user's sensory perceptions of the real world with a virtual experience. One example of this type of system is a head-worn display system, such as the VR system 1000 in FIG. 10 that mostly or completely covers a user's field of view. The VR system 1000 may include a front rigid body 1002 and a band 1004 shaped to fit around a user's head. The VR system 1000 may also include output audio transducers 1006(A) and 1006(B). Furthermore, while not shown in FIG. 10, the front rigid body 1002 may include one or more electronic elements, including one or more electronic displays, one or more IMUs, one or more tracking emitters or detectors, and/or any other suitable device or system for creating an artificial reality experience. Although not shown, the VR system 1000 may include the computer system 130.

Artificial reality systems may include a variety of types of visual feedback mechanisms. For example, display devices in the AR system 900 and/or the VR system 1000 may include one or more liquid-crystal displays (LCDs), light emitting diode (LED) displays, organic LED (OLED) displays, and/or any other suitable type of display screen. Artificial reality systems may include a single display screen for both eyes or may provide a display screen for each eye, which may allow for additional flexibility for varifocal adjustments or for correcting a user's refractive error. Some artificial reality systems may also include optical subsystems having one or more lenses (e.g., conventional concave or convex lenses, Fresnel lenses, or adjustable liquid lenses) through which a user may view a display screen.

In addition to or instead of using display screens, some artificial reality systems include one or more projection systems. For example, display devices in the AR system 900 and/or the VR system 1000 may include micro-LED projectors that project light (e.g., using a waveguide) into display devices, such as clear combiner lenses that allow ambient light to pass through. The display devices may refract the projected light toward a user's pupil and may enable a user to simultaneously view both artificial reality content and the real world. Artificial reality systems may also be configured with any other suitable type or form of image projection system.

Artificial reality systems may also include various types of computer vision components and subsystems. For example, the AR system 800, the AR system 900, and/or the VR system 1000 may include one or more optical sensors such as two-dimensional (2D) or three-dimensional (3D) cameras, time-of-flight depth sensors, single-beam or sweeping laser rangefinders, 3D LiDAR sensors, and/or any other suitable type or form of optical sensor. An artificial reality system may process data from one or more of these sensors to identify the location of a user, to map the real world, to provide a user with context about real-world surroundings, and/or to perform a variety of other functions.

Artificial reality systems may also include one or more input and/or output audio transducers. In the examples shown in FIGS. 8 and 10, output audio transducers 808(A), 808(B), 1006(A), and 1006(B) may include voice coil speakers, ribbon speakers, electrostatic speakers, piezoelectric speakers, bone conduction transducers, cartilage conduction transducers, and/or any other suitable type or form of audio transducer. Similarly, input audio transducers 810 may include condenser microphones, dynamic microphones, ribbon microphones, and/or any other type or form of input transducer. In some embodiments, a single transducer may be used for both audio input and audio output.

The artificial reality systems shown in FIGS. 8-10 may include tactile (i.e., haptic) feedback systems, which may be incorporated into headwear, gloves, body suits, handheld controllers, environmental devices (e.g., chairs, floormats, etc.), and/or any other type of device or system, such as the wearable devices 102 discussed herein. Additionally, in some embodiments, the haptic feedback systems are incorporated with the artificial reality systems (e.g., the AR system 800 may include the wearable device 102). Haptic feedback systems may provide various types of cutaneous feedback, including vibration, force, traction, texture, and/or temperature. Haptic feedback systems may also provide various types of kinesthetic feedback, such as motion and compliance. Haptic feedback may be implemented using motors, piezoelectric actuators, fluidic systems, and/or a variety of other types of feedback mechanisms. Haptic feedback systems may be implemented independently of other artificial reality devices, within other artificial reality devices, and/or in conjunction with other artificial reality devices.

By providing haptic sensations, audible content, and/or visual content, artificial reality systems may create an entire virtual experience or enhance a user's real-world experience in a variety of contexts and environments. For instance, artificial reality systems may assist or extend a user's perception, memory, or cognition within a particular environment. Some systems may enhance a user's interactions with other people in the real world or may enable more immersive interactions with other people in a virtual world. Artificial reality systems may also be used for educational purposes (e.g., for teaching or training in schools, hospitals, government organizations, military organizations, or business enterprises), entertainment purposes (e.g., for playing video games, listening to music, or watching video content), and/or for accessibility purposes (e.g., as hearing aids or vision aids). The embodiments disclosed herein may enable or enhance a user's artificial reality experience in one or more of these contexts and environments and/or in other contexts and environments.

Some AR systems map a user's environment using techniques referred to as "simultaneous location and mapping" (SLAM). SLAM mapping and location identifying techniques may involve a variety of hardware and software tools that can create or update a map of an environment while simultaneously keeping track of a device's or a user's location and/or orientation within the mapped environment. SLAM may use many different types of sensors to create a map and determine a device's or a user's position within the map.

SLAM techniques may, for example, implement optical sensors to determine a device's or a user's location, position, or orientation. Radios including WiFi, Bluetooth, global positioning system (GPS), cellular or other communication devices may also be used to determine a user's location relative to a radio transceiver or group of transceivers (e.g., a WiFi router or group of GPS satellites). Acoustic sensors such as microphone arrays or 2D or 3D sonar sensors may also be used to determine a user's location within an environment. AR and VR devices (such as the systems 800, 900, and 1000) may incorporate any or all of these types of sensors to perform SLAM operations such as creating and continually updating maps of a device's or a user's current environment. In at least some of the embodiments described herein, SLAM data generated by these sensors is referred to as "environmental data" and may indicate a device's or a user's current environment. This data may be stored in a local or remote data store (e.g., a cloud data store) and may be provided to a user's AR/VR device on demand.

When a user is wearing an AR headset or VR headset in a given environment, the user may be interacting with other users or other electronic devices that serve as audio sources. In some cases, it may be desirable to determine where the audio sources are located relative to the user and then present the audio sources to the user as if they were coming from the location of the audio source. The process of determining where the audio sources are located relative to the user may be referred to herein as "localization," and the process of rendering playback of the audio source signal to appear as if it is coming from a specific direction may be referred to herein as "spatialization."

Localizing an audio source may be performed in a variety of different ways. In some cases, an AR or VR headset may initiate a DOA analysis to determine the location of a sound source. The DOA analysis may include analyzing the intensity, spectra, and/or arrival time of each sound at the AR/VR device to determine the direction from which the sound originated. In some cases, the DOA analysis may include any suitable algorithm for analyzing the surrounding acoustic environment in which the artificial reality device is located.

For example, the DOA analysis may be designed to receive input signals from a microphone and apply digital signal processing algorithms to the input signals to estimate the direction of arrival. These algorithms may include, for example, delay and sum algorithms where the input signal is sampled, and the resulting weighted and delayed versions of the sampled signal are averaged together to determine a direction of arrival. A least mean squared (LMS) algorithm may also be implemented to create an adaptive filter. This adaptive filter may then be used to identify differences in signal intensity, for example, or differences in time of arrival. These differences may then be used to estimate the direction of arrival. In another embodiment, the DOA may be determined by converting the input signals into the frequency domain and selecting specific bins within the time-frequency (TF) domain to process. Each selected TF bin may be processed to determine whether that bin includes a portion of the audio spectrum with a direct-path audio signal. Those bins having a portion of the direct-path signal may then be analyzed to identify the angle at which a microphone array received the direct-path audio signal. The determined angle may then be used to identify the direction of arrival for the received input signal. Other algorithms not listed above may also be used alone or in combination with the above algorithms to determine DOA.

In some embodiments, different users may perceive the source of a sound as coming from slightly different locations. This may be the result of each user having a unique head-related transfer function (HRTF), which may be dictated by a user's anatomy including ear canal length and the positioning of the ear drum. The artificial reality device may provide an alignment and orientation guide, which the user may follow to customize the sound signal presented to the user based on their unique HRTF. In some embodiments, an AR or VR device may implement one or more microphones to listen to sounds within the user's environment. The AR or VR device may use a variety of different array transfer functions (ATFs) (e.g., any of the DOA algorithms identified above) to estimate the direction of arrival for the sounds. Once the direction of arrival has been determined, the artificial reality device may play back sounds to the user according to the user's unique HRTF. Accordingly, the DOA estimation generated using an ATF may be used to determine the direction from which the sounds are to be played from. The playback sounds may be further refined based on how that specific user hears sounds according to the HRTF.

In addition to or as an alternative to performing a DOA estimation, an artificial reality device may perform localization based on information received from other types of sensors. These sensors may include cameras, infrared radiation (IR) sensors, heat sensors, motion sensors, global positioning system (GPS) receivers, or in some cases, sensor that detect a user's eye movements. For example, an artificial reality device may include an eye tracker or gaze detector that determines where a user is looking. Often, a user's eyes will look at the source of a sound, if only briefly. Such clues provided by the user's eyes may further aid in determining the location of a sound source. Other sensors such as cameras, heat sensors, and IR sensors may also indicate the location of a user, the location of an electronic device, or the location of another sound source. Any or all of the above methods may be used individually or in combination to determine the location of a sound source and may further be used to update the location of a sound source over time.

Some embodiments implement the determined DOA to generate a more customized output audio signal for the user. For instance, an acoustic transfer function may characterize or define how a sound is received from a given location. More specifically, an acoustic transfer function may define the relationship between parameters of a sound at its source location and the parameters by which the sound signal is detected (e.g., detected by a microphone array or detected by a user's ear). An artificial reality device may include one or more acoustic sensors that detect sounds within range of the device. A controller of the artificial reality device may estimate a DOA for the detected sounds (using, e.g., any of the methods identified above) and, based on the parameters of the detected sounds, may generate an acoustic transfer function that is specific to the location of the device. This customized acoustic transfer function may thus be used to generate a spatialized output audio signal where the sound is perceived as coming from a specific location.

Once the location of the sound source or sources is known, the artificial reality device may re-render (i.e., spatialize) the sound signals to sound as if coming from the direction of that sound source. The artificial reality device may apply filters or other digital signal processing that alter the intensity, spectra, or arrival time of the sound signal. The digital signal processing may be applied in such a way that the sound signal is perceived as originating from the determined location. The artificial reality device may amplify or subdue certain frequencies or change the time that the signal arrives at each ear. In some cases, the artificial reality device may create an acoustic transfer function that is specific to the location of the device and the detected direction of arrival of the sound signal. In some embodiments, the artificial reality device may re-render the source signal in a stereo device or multi-speaker device (e.g., a surround sound device). In such cases, separate and distinct audio signals may be sent to each speaker. Each of these audio signals may be altered according to a user's HRTF and according to measurements of the user's location and the location of the sound source to sound as if they are coming from the determined location of the sound source. Accordingly, in this manner, the artificial reality device (or speakers associated with the device) may re-render an audio signal to sound as if originating from a specific location.

Although some of various drawings illustrate a number of logical stages in a particular order, stages which are not order dependent may be reordered and other stages may be combined or broken out. While some reordering or other groupings are specifically mentioned, others will be obvious to those of ordinary skill in the art, so the ordering and groupings presented herein are not an exhaustive list of alternatives. Moreover, it should be recognized that the stages could be implemented in hardware, firmware, software or any combination thereof.

The foregoing description, for purpose of explanation, has been described with reference to specific embodiments. However, the illustrative discussions above are not intended to be exhaustive or to limit the scope of the claims to the precise forms disclosed. Many modifications and variations are possible in view of the above teachings. The embodiments were chosen in order to best explain the principles underlying the claims and their practical applications, to thereby enable others skilled in the art to best use the embodiments with various modifications as are suited to the particular uses contemplated.

What is claimed is:

1. A wearable device, comprising:
   a strap;
   a base coupled to the strap;
   a display detachably coupled to the base; and
   a plurality of cameras embedded within the display, wherein the display is configured to rotate around an axis normal to the base to select one of a plurality of predetermined rotational orientations of the display with respect to the base, each predetermined rotational orientation activating a respective one of the plurality of cameras.

2. The wearable device of claim 1, wherein each of the plurality of cameras has a respective distinct lens.

3. The wearable device of claim 2, wherein the lenses of the plurality of cameras are selected from the group consisting of: a macro lens, a prime telephoto lens, an optical zoom lens, and a normal lens.

4. The wearable device of claim 1, wherein the display is a first display, and the wearable device further comprises a second display having one or more second cameras embedded within the second display, distinct from the first display, the second display configured to detachably couple to the base in place of the first display.

5. The wearable device of claim 1, wherein the base and the display are both square shaped, the base and the display are both circular in shape, or the base and the display are both rectangular in shape.

6. The wearable device of claim 1, wherein the base and the display share a shape that has a plurality of rotational symmetries around a central perpendicular axis to the display.

7. The wearable device of claim 1, wherein the base includes one or more dot-like pads configured to electromagnetically connect to one or more dot-like pads of the display.

8. The wearable device of claim 1, wherein the display includes one or more dot-like pads configured to electrically connect to one or more dot-like pads of the base.

9. The wearable device of claim 1, wherein the base includes one or more dot-like pads configured to electrically connect to one or more dot-like pads of the display.

10. The wearable device of claim 9, wherein the one or more dot-like pads of the display are configured to magnetically adhere to the one or more dot-like pads of the base using magnetic coupling between the pads of the display and the pads of the base.

11. The wearable device of claim 9, wherein the one or more dot-like pads of the display are configured to mechanically latch to the one or more dot-like pads of the base.

12. The wearable device of claim 9, wherein the display is configured to make an electrical connection between the one or more dot-like pads of the display with the one or more dot-like pads of the base at any of the predetermined rotational orientations of the display with respect to the base.

13. A method, comprising:
    at a wearable device having a strap, a base coupled to the strap, and a first display detachably coupled to the base, wherein the first display has a plurality of embedded cameras and the first display is configured to rotate around an axis normal to the base to select one of a plurality of predetermined rotational orientations of the first display with respect to the base, each predetermined rotational orientation activating a respective one of the plurality of cameras:
    receiving user input to capture a first image using a first camera of the plurality of cameras according to a first predetermined rotational orientation of the first display.

14. The method of claim 13, further comprising:
    receiving user input to rotate the first display to a second predetermined rotational orientation, thereby activating a second camera of the plurality of cameras; and
    receiving user input to capture a second image using the second camera.

15. The method of claim 13, further comprising:
    detaching the first display from the base; and
    attaching a second display to the base, wherein the second display (i) is distinct from the first display and (ii) has a second plurality of cameras, wherein rotating the second display to any of the predetermined rotational orientations activates a respective one of the second plurality of cameras.

16. The method of claim 13, wherein each of the plurality of cameras has a respective distinct lens, and the lenses of the plurality of cameras are selected from the group consisting of: a macro lens, a prime telephoto lens, an optical zoom lens, and a normal lens.

17. The method of claim 13, wherein the base includes one or more dot-like pads configured to electrically connect to respective dot-like pads of the first display.

18. The method of claim 13, wherein the base includes one or more dot-like pads and the first display is configured to make a respective electrical connection between respective dot-like pads of the first display with the one or more dot-like pads of the base at any of the predetermined rotational orientations of the respective display with respect to the base.

19. A system, comprising:
    a wearable device, including:
        a strap;
        a base coupled to the strap;
        a display detachably coupled to the base; and
        a plurality of cameras embedded within the display, wherein the display is configured to rotate around an axis normal to the base to select one of a plurality of predetermined rotational orientations of the display with respect to the base, each predetermined rotational orientation activating a respective one of the plurality of cameras; and
    an artificial reality headset in communication with the wearable device.

* * * * *